United States Patent
Koop et al.

(10) Patent No.: US 10,830,311 B2
(45) Date of Patent: Nov. 10, 2020

(54) HELICAL PLANETARY GEAR AND INTERNAL HELICAL GEAR FOR A HELICAL PLANETARY GEAR UNIT AS WELL AS HELICAL PLANETARY GEAR UNIT FOR AN ADJUSTING DEVICE FOR ADJUSTING TWO COMPONENTS WHICH ARE ADJUSTABLE WITH RESPECT TO ONE ANOTHER

(71) Applicant: IMS Gear SE & Co. KGaA, Donaueschingen (DE)

(72) Inventors: Matthias Koop, Donaueschingen (BE); Simon Albert, Friedenweiler (BE); Matthias Kieninger, Unterkirnach (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 135 days.

(21) Appl. No.: 16/152,099

(22) Filed: Oct. 4, 2018

(65) Prior Publication Data

US 2019/0154118 A1    May 23, 2019

(30) Foreign Application Priority Data

Nov. 17, 2017 (EP) ..................................... 17202338

(51) Int. Cl.
    *F16H 1/30* (2006.01)
    *F16H 55/08* (2006.01)
    (Continued)

(52) U.S. Cl.
    CPC ............... *F16H 1/30* (2013.01); *F16H 55/06* (2013.01); *F16H 55/0853* (2013.01); *F16H 2055/065* (2013.01); *F16H 2055/176* (2013.01)

(58) Field of Classification Search
    CPC ........ F16H 1/30; F16H 55/0853; F16H 55/06; F16H 2055/176; F16H 2055/065
    (Continued)

(56) References Cited

U.S. PATENT DOCUMENTS 1,276,855 A      8/1918   Apple
1,567,933 A * 12/1925   Fahnestock .............. B62D 1/10
                                                                   475/333
(Continued)

FOREIGN PATENT DOCUMENTS

CH            707435        7/2014
EP            2166252        3/2010
(Continued)

OTHER PUBLICATIONS

Korean Patent Office, "Office Action", which was issued to Korean counterpart application No. 10-2018-141995, document of 13 pages, dated Dec. 10, 2019.

(Continued)

*Primary Examiner* — Roger L Pang
(74) *Attorney, Agent, or Firm* — Akerman LLP; Peter A. Chiabotti

(57) ABSTRACT

A helical planetary gear for a helical planetary gear unit for an adjusting device in vehicles for adjusting two components which are adjustable with respect to one another, wherein the helical planetary gear defines a planetary gear axis and comprises planetary gear toothing having a first planetary gear toothing end and a second planetary gear toothing end, wherein the first planetary gear toothing end and the second planetary gear toothing end are arranged apart from one another in relation to the planetary gear axis, and the planetary gear toothing has a diameter that increases or decreases proceeding from the first planetary gear toothing end to the second planetary gear toothing end and further (Continued)

relates to an internal helical gear for a helical planetary gear unit as well as a helical planetary gear unit for an adjusting unit for adjusting two components which are adjustable with respect to one another.

9 Claims, 3 Drawing Sheets

(51) Int. Cl.
*F16H 55/06* (2006.01)
*F16H 55/17* (2006.01)

(58) Field of Classification Search
USPC .................................. 475/336, 344; 74/458
See application file for complete search history.

(56) References Cited

U.S. PATENT DOCUMENTS

| | | | | |
|---|---|---|---|---|
| 3,486,394 A | * | 12/1969 | Heidrich | F16H 1/08 74/458 |
| 7,854,995 B1 | * | 12/2010 | Anderson | B21K 1/30 428/546 |
| 8,057,352 B2 | * | 11/2011 | Nishiji | F16H 48/285 475/180 |
| 8,357,071 B2 | * | 1/2013 | Hino | B62M 11/14 475/338 |
| 2007/0042860 A1 | * | 2/2007 | Rihn | F16H 55/0886 475/344 |
| 2016/0109015 A1 | * | 4/2016 | Kind | F16H 55/06 74/434 |
| 2016/0297469 A1 | | 10/2016 | Galehr | |

FOREIGN PATENT DOCUMENTS

| | | |
|---|---|---|
| JP | 2010-121676 | 6/2010 |
| JP | 2009-8201 | 7/2010 |
| WO | 2015/036328 | 3/2015 |

OTHER PUBLICATIONS

European Patent Office, "Search Report" issued in European Patent Application No. 17202338.4, dated May 29, 2018, document of 8 pages.

* cited by examiner

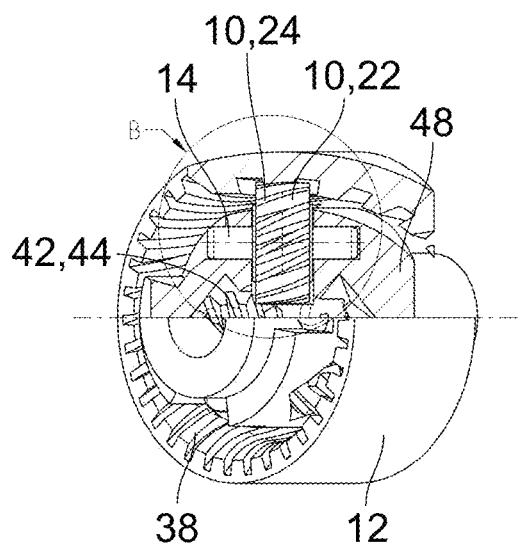
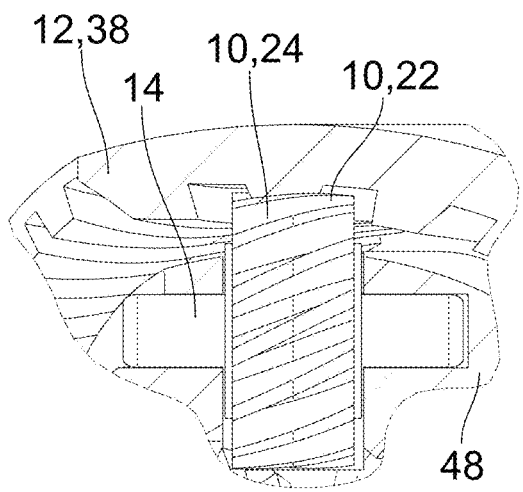
Fig.2c)          Fig.2d)
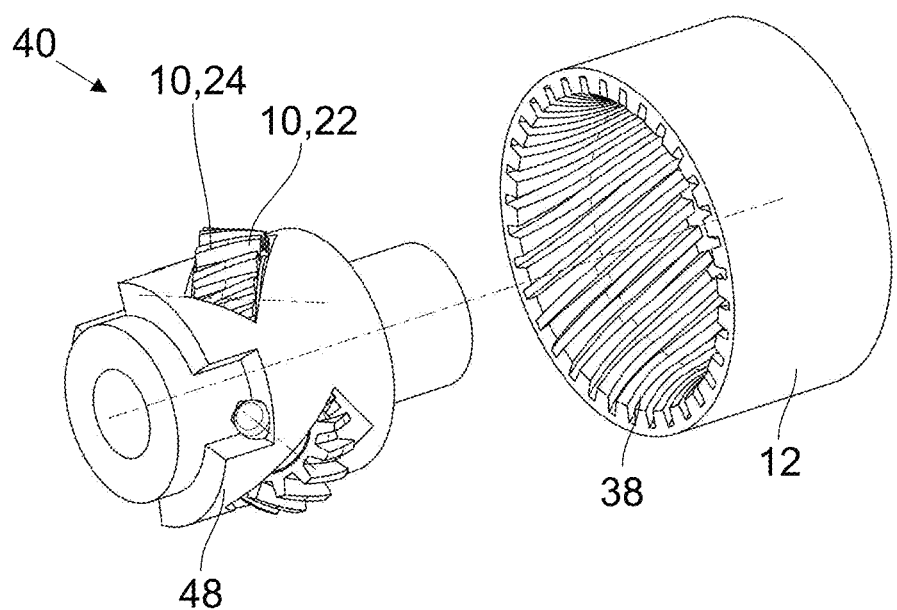
Fig.2e)

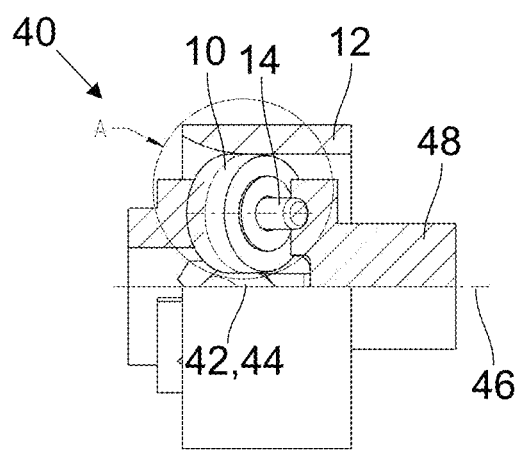
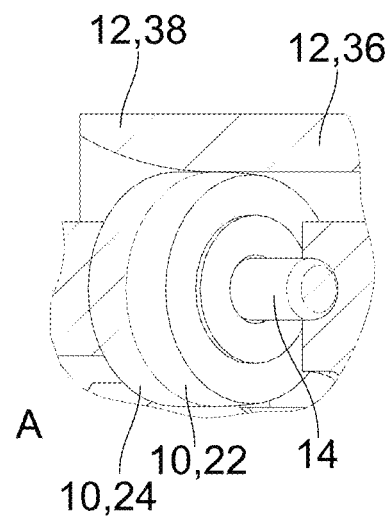
Fig.3a)
Fig.3b)
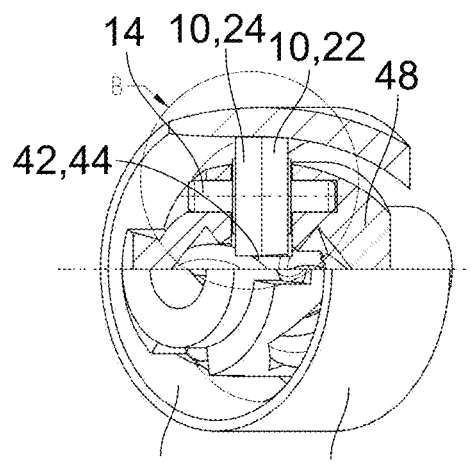
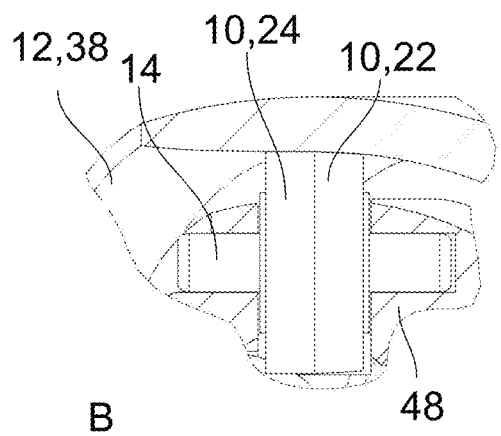
Fig.3c)
Fig.3d)
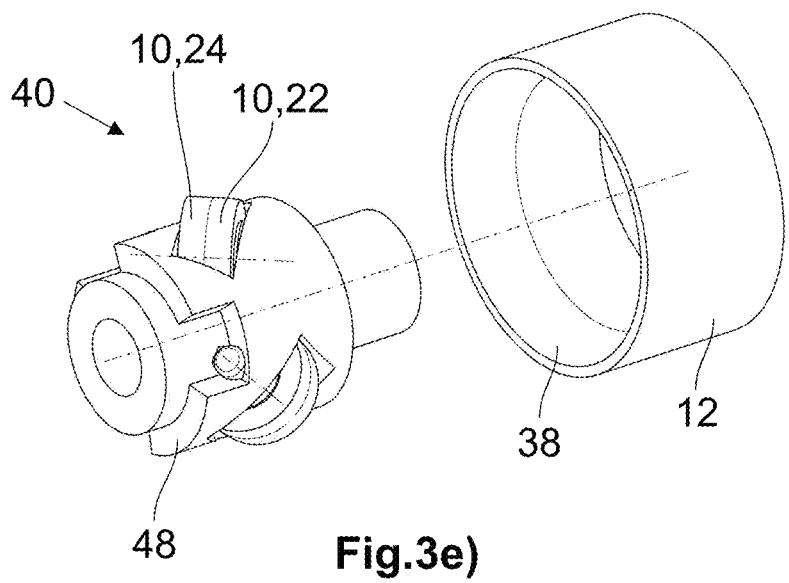
Fig.3e)

HELICAL PLANETARY GEAR AND INTERNAL HELICAL GEAR FOR A HELICAL PLANETARY GEAR UNIT AS WELL AS HELICAL PLANETARY GEAR UNIT FOR AN ADJUSTING DEVICE FOR ADJUSTING TWO COMPONENTS WHICH ARE ADJUSTABLE WITH RESPECT TO ONE ANOTHER

CROSS-REFERENCE TO RELATED APPLICATIONS

This application claims priority to European Patent Application No. 17202338.4, filed Nov. 17, 2017, which is incorporated by reference in its entirety.

BACKGROUND

The present application relates to a helical planetary gear and internal helical gear for a helical planetary gear unit for an adjusting device for adjusting two components which are adjustable with respect to one another. The application further relates to a helical planetary gear unit with at least one such helical planetary gear and an internal helical gear for such an adjusting device.

SUMMARY

Planetary gear units are used in many drive trains, because they enable large gear or reduction ratios in a small space. Auxiliary drives for motor vehicles with which two vehicle parts which can be adjusted with respect one another can be moved relative to one another represent one application area. Electromechanical actuator arrangements, which are used to actuate parking brakes of motor vehicles, among other things, are an example of such auxiliary drives. Other auxiliary drives are used, for example, for seat forward-backward adjustments, rear gate/tailgate adjustments, window levers, and sunroof adjustments. Because the available space is tight in motor vehicles, planetary gear units can leverage their advantages especially well.

Drives for windows and shutters in buildings, for example, which are playing an increasingly more important role in the process of the increasing digitalization of buildings characterized by the term "smart home," are another application area.

Electric motors are used almost without exception as the drive source in auxiliary drives. The electric motors typically used frequently rotate at a comparatively high rotational speed such that high gear reductions are required in order to adjust the components with the desired, comparatively slow movement relative to one another. In addition, the torques rendered by the electric motor are frequently insufficient for moving the components, which means that the reductions are also necessary for this reason.

Even when known planetary gear units can provide high gear or reduction ratios, they are not sufficient in some application areas so that two-stage or multi-stage gear units must be used, in which two or more planetary gear units are arranged in the drive train. This increases the complexity of the drive train, whereby, in comparison with a single-stage helical planetary gear unit, production is made more complicated, probability of failure is increased, and installation space is increased.

One option for increasing the gear or reduction ratios of planetary gear units is the use of so-called "coaxial gear units." The gear wheels of customary planetary gear units are formed as spur gears. With coaxial gear units, the sun gear is formed as a worm and the planetary gears are formed with correspondingly adapted planetary gear toothing. The ring gear has inner toothing corresponding to the planetary gear toothing.

An especially prominent feature of such coaxial gear units is the fact that the planetary gear axes do not extend parallel to the rotational axis of the worm but rather skewed thereto. The term "coaxial gear unit" is not applicable, at least with respect to this, meaning that such gear units are characterized as worm planetary gear units below. Such worm planetary gear units are disclosed, for example, in WO 2015/036328 A1 and EP 2 166 252 A1. In addition to the high gear or reduction ratios, such worm planetary gear units provide a smooth running performance with low noise development.

With conventional planetary gear units, the planetary gears are designed as spur gears, which have a cylindrical cross-section based on a sectional plane extending through the planetary gear axis. Due to the fact that the sun gear is formed as a worm and the planetary gear axes extend skewed with respect to the rotational axis of the worm, the cross-section of the planetary gears must be adapted in order to ensure uniform meshing with the worm over the entire width of the planetary gear toothing. At least within the planetary gear toothing, the cross-section has a somewhat strongly pronounced curvature or crowning, such that almost spherical planetary gears can result depending on the design, as is the case with the planetary gears disclosed in EP2,166,252 B1.

Such curved or crowned planetary gears, however, have an undercut in relation to the planetary gear axis such that, in the event they are to be produced in a casting process, two casting molds are necessary that are pushed together in one plane which extends vertically with respect to the planetary gear axis and through the outermost circumference radially of the planetary gear. In this plane, the two casting molds are then separated from one another for removal from the mold, such that flashing forms there on the planetary gear. As previously mentioned, worm planetary gear units are characterized by a smooth running performance with low noise development. Due to the flashing however, the noise development increases such that an essential advantage of the worm planetary gear units is eliminated, at least partially. Because the spur gears likewise have a corresponding curvature or crowning for providing a uniform mesh over the entire breadth of the planetary gear toothing, flashing also results here if the spur gear is produced in a casting process. Flashing also results in increased noise development in the spur gear.

The object of one embodiment of the present disclosure provides a helical planetary gear for a helical planetary gear unit, which can be produced in a casting process and leads to low noise development during operation of the helical planetary gear unit. Furthermore, the object upon which one embodiment of the present disclosure is based is to obtain an internal helical gear for a helical planetary gear unit, which can be produced in a casting process and leads to low noise development during operation of the helical gear unit. Furthermore, an object upon which a design of the disclosure is based is to provide a helical planetary gear unit, which leads to low noise development during operation and can be installed in a simple manner.

Said object is achieved the features and structures recited herein. Advantageous embodiments of the present disclosure are also recited herein.

One embodiment of the disclosure relates to a helical planetary gear for a helical planetary gear unit for an adjusting device for adjusting two components which are adjustable with respect to one another, in which the helical planetary gear defines a planetary gear axis and planetary gear toothing comprises a first planetary gear toothing end and a second planetary gear toothing end, in which the first planetary gear toothing end and the second planetary gear toothing end are arranged apart from one another in relation to the planetary gear axis, in which the planetary gear toothing has a diameter that increases or decreases proceeding from the first planetary gear toothing end to the second planetary gear toothing end.

Although the present disclosure relates to helical planetary gear units, it can also be applied to worm planetary gear units without any limitation, as they are disclosed in WO 2015/036328 A1 and EP 2 166 252 A1. Helical planetary gear units and worm planetary gear units have extensive similarities but differ, however, primarily in the following point: While a single-point contact, which becomes a so-called pressure ellipse under load, is present on the helical gear in helical planetary gear units, worm planetary gear units have a linear contact due to the globoid shape of the toothing section of the worm and the planetary gears. However, because the planetary gears have a curvature in both types of planetary gear units, the flashing problem also occurs with both types when the planetary gears are produced in a casting process.

According to the proposal, the planetary gear toothing has a diameter that increases or decreases from the first planetary gear toothing end to the second planetary gear toothing end. This feature is to be understood such that the diameter either only increases or only decreases starting from one planetary gear toothing end to the other planetary gear toothing end, but under no circumstance both increases and decreases. In any case, the planetary gear toothing has a different diameter at one planetary gear toothing end than at the other planetary gear toothing end. This also includes the case in which the diameter of the planetary gear toothing also remains unchanged in some sections. This means that no undercut is created in relation to the planetary gear axis and thus the entire planetary gear toothing can be produced in one casting mold. Flashing can be arranged outside of the planetary gear toothing. For removal, the planetary gear can be removed from the cast mold using a movement directed parallel to the planetary gear axis. Depending on the design of the planetary gear toothing, the planetary gear must be rotated about the planetary gear axis relative to the casting mold during removal. This means that the planetary gear toothing can be produced without flashing such that the noise development caused by flashing is eliminated.

The helical planetary gear can be used with a corresponding adaptation of the planetary gear toothing for a worm planetary gear unit, in which the same advantages result.

The components which are adjustable with respect to one another using the adjusting device may be vehicle parts such as vehicle seats, tailgates/rear gates, vehicle windows, or sunroofs. The components, however, may also be windows, blinds, or shutters of buildings or ships. The acoustic properties of the adjusting device equipped with the planetary carrier according to the proposal differ significantly from the known adjusting devices such that less noise development can be achieved.

According to a further embodiment, the planetary gear consists of plastic and is casted, particularly injection-molded. Particularly technical thermoplastics such as polyamide (PA), polybutylene terephthalate (PBT), or polyoxymethylene (POM) or high-performance thermoplastics such as polyether ether ketone (PEEK) are suitable as the plastics. These thermoplastics fulfill the requirements during operation of the helical planetary gear unit very well and can be injection-molded. The injection-molding process has particular advantage because the planetary gears can be economically produced in large quantities in a short time.

A further embodiment is characterized in that the helical planetary gear consists of metal. The use of metal for the helical planetary gear is particularly well-suited when the helical planetary gear is under high load and therefore cannot be produced from plastic. In this case, the helical planetary gear may consist of steel or aluminum. The helical planetary gear can be produced using a casting process such as sintering or die-casting.

One embodiment of the disclosure relates to an internal helical gear for a helical planetary gear unit for an adjusting device for adjusting two components which are adjustable with respect to one another, in which the internal helical gear defines an internal helical gear axis and inner toothing comprises a first planetary gear toothing end and a second planetary gear toothing end, in which the first planetary gear toothing end and the second planetary gear toothing end are arranged apart from one another in relation to the internal helical gear axis, in which the inner toothing has a diameter that increases or decreases proceeding from the first planetary gear toothing end to the second planetary gear toothing end.

The technical effects and advantages discussed for the planetary gears apply equally to the internal helical gear. The development of the diameter of the inner toothing provides a uniform mesh with the planetary toothing over the entire breadth.

Particularly, the inner toothing can be produced in a cast process without flashing so that the noise development is kept low during operation of the helical planetary gear unit. The internal helical gear can be used with a corresponding adaptation of the inner toothing as a spur gear for a worm planetary gear unit, in which the same advantages result.

In a further refinement, the internal helical gear may consist of plastic and be casted, particularly injection-molded. Particularly technical thermoplastics such as polyamide (PA), polybutylene terephthalate (PBT), or polyoxymethylene (POM) or high-performance thermoplastics such as polyether ether ketone (PEEK) are suitable as the plastics for the internal helical gear as well. These thermoplastics fulfill the requirements during operation of the helical planetary gear unit very well and can be injection-molded. The injection-molding process has particular advantage because the spur gears can be economically produced in large quantities in a short time. Other casting processes such as die-casting or 3-D printing can also be used.

In a further refinement, the internal helical gear consists of metal. The use of metal for the internal helical gear is particularly well-suited when the internal helical gear is under high load and therefore cannot be produced from plastic. In this case, the internal helical gear may consist of steel or aluminum. The internal helical gear can be produced using a casting process such as sintering or die-casting.

One design of the disclosure relates to a helical planetary gear unit for an adjusting device for adjusting two components which are adjustable with respect to one another, comprising a helical gear shaft with helical gear toothing, which is mounted so as to rotate about a helical gear shaft axis, a planetary carrier with at least one planetary gear according to any of the embodiments previously mentioned, which is mounted so as to rotate in the planetary carrier about the planetary gear axis, in which the planetary gear axis extends skewed with respect to the planetary gear shaft axis and the planetary gear toothing is meshed with the helical gear toothing, and an internal helical gear according to any of the previously mentioned embodiments, with inner toothing, which is meshed with the planetary gear toothing.

The technical effects and advantages that can be achieved with the helical planetary gear unit according to the proposal correspond to those that have been mentioned for the present planetary gear as well as the internal helical gear according to the proposal. In summary, it should be noted that the planetary gears are in a uniform mesh with the helical gear toothing and the inner toothing over the entire width of the planetary gear toothing, such that the proposed helical planetary gear unit provides smooth running performance with low noise development and still can be produced in high quantities at economical costs.

The described technical effects and advantages that can be achieved with the helical planetary gear unit according to the proposal can also be implemented for worm planetary gear units with a corresponding adaptation of the toothing of the helical gear, the planetary gears, and the internal helical gear.

In addition, the disclosure relates to the use of a planetary carrier according to the proposal and adjusting devices in vehicles for adjusting two vehicle parts which are adjustable with respect one another.

BRIEF DESCRIPTION OF DRAWINGS

Exemplary embodiments of the present disclosure are explained in greater detail below with reference to the enclosed drawings. Wherein:

FIG. 2c) shows a helical planetary gear unit according to the proposal by means of a second partial sectional view;

FIG. 2d) shows an enlarged view of area B marked in FIG. 2c);

FIG. 2e) shows a perspective view of the helical planetary gear unit shown in FIGS. 2a) to 2d) in an uninstalled condition; and FIGS. 3a) to 3e) show the same views as in FIGS. 2a) to 2e), in which the toothing sections have been omitted for reasons related to the view.

DETAILED DESCRIPTION

Figure 1:
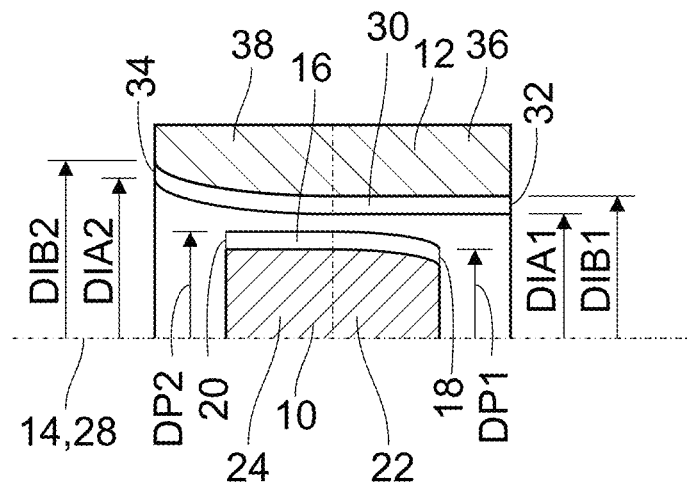
FIG. 1 shows a schematic sectional view of a planetary gear according to the proposal and an internal helical gear according to the proposal.

FIG. 1 shows a schematic view of a helical planetary gear 10 according to the disclosure and an internal helical gear 12 according to the disclosure. FIG. 1 is used exclusively to explain the inventive principle and is therefore greatly simplified. Particularly, FIG. 1 does not enable any conclusion to be made regarding the alignment of the helical planetary gear 10 in relation to the internal helical gear 12.

The helical planetary gear 10 has a planetary gear axis 14 and planetary gear toothing 16. Furthermore, the helical planetary gear 10 has a first planetary gear toothing end 18 and a second planetary gear toothing end 20, which are arranged apart from one another in relation to the planetary gear axis 14. The planetary gear toothing 16 has a diameter DP, which may be, for example, the root diameter, the pitch diameter, or the tip diameter. The tip diameter is outlined approximately in FIG. 1. Regardless of which diameter DP is used for the planetary gear toothing 16, the diameter DP of the planetary gear toothing 16 increases in the exemplary embodiment shown in FIG. 1 from the first planetary gear toothing end 18 to the second planetary gear toothing end 20. Consequently, diameter DP1 of the planetary gear toothing 16 at the first planetary gear toothing end 18 is smaller than diameter DP2 of the planetary gear toothing 16 at the second planetary gear toothing end 20. This means that the planetary gear may also have sections in which the diameter DP does not increase but instead remains constant.

In the example shown in FIG. 1, the helical planetary gear 10 has a first section 22 and a second section 24. The first section 22 starts from the first planetary gear toothing end 18 and extends to about half of the helical planetary gear 10 in relation to the planetary gear axis 14. The second section 24 connects to the first section 22 and extends to the second planetary gear toothing end 20. The extension of the first and of the second section 22, 24 is selected here purely for viewing reasons. It is just as possible for the first section 22 to be significantly further extended than the second section 24 or vice versa, in relation to the internal helical gear axis 28.

The diameter DP of the planetary gear toothing 16 increases in the first section 22, while the diameter DP in the second section 24 remains constant. The diameter DP in the first section 22 increases in this case such that the planetary gear toothing 16 has a curvature or crowning.

The feature according to which the diameter DP of the planetary gear toothing 16 increases from the first planetary gear toothing end 18 to the second planetary gear toothing end 20 means that the diameter DP, as shown in FIG. 1, can remain constant in some sections, but under no circumstance, not even in any section, does it decrease from the first planetary gear toothing end 18 to the second planetary gear toothing end 20.

If the change in diameter of the planetary gear toothing 16 in relation to FIG. 1 is considered starting from the second planetary gear toothing end 20 to the first planetary gear toothing end 18, the reverse case results. In this case, the diameter DP decreases from the second planetary gear toothing end 20 to the first planetary gear toothing end 18, in which the diameter DP can also remain constant in some sections. Under no circumstance does it increase when considered starting from the second planetary gear toothing end 20 to the first planetary toothing end 18.

The second section 24, in which the planetary gear toothing 16 has a constant diameter and consequently is not curved, can also be omitted.

The internal helical gear 12 shown in FIG. 1 has an internal helical gear axis 28 and inner toothing 30. Furthermore, the internal helical gear 12 has a first inner toothing end 32 and a second inner toothing end 34. The inner toothing 30 has a diameter DI, which, as previously stated regarding the helical planetary gear 10, may be, for example, the tip diameter, the tip diameter, or the pitch diameter. FIG. 1 shows both the tip diameter DIA and the root diameter DIB.

Regardless of which diameter DI is used for the inner toothing 30, the diameter DI increases from the first inner toothing end 32 to the second inner toothing end 32. Consequently, the tip diameter DIA1 and the pitch diameter DIB1 at the first inner toothing end 32 is smaller than the tip diameter DIA2 and the pitch diameter DIB2 at the second inner toothing end 34. Just as the helical planetary gear 10, the internal helical gear 12 can be subdivided into a first section 36 and a second section 38. The first section 36 starts from the first inner toothing end 32 and extends to about the middle of the internal helical gear 12 in relation to the internal helical gear axis 28. The second section 38 connects to the first section 36 and extends to the second inner toothing end 34. The extensions of the first and of the second section 36, 38 are selected here purely for viewing reasons. It is just as possible for the first section 36 to be significantly further extended than the second section 38 or vice versa, in relation to the internal helical gear axis 28.

The diameter DI of the inner toothing 30 remains constant in the first section 36, while the diameter DI in the second section 38 increases. In doing so, the diameter DI increases such that the inner toothing 30 has a curvature or crowning in the second section 38. As previously stated regarding the helical planetary gear 10, the inner toothing 30 does not have any sections in which the diameter DP decreases starting from the first inner toothing end 32 to the second inner toothing end 32.

If the change in diameter DI of the inner toothing 30 in relation to FIG. 1 is considered starting from the second inner toothing end 34 to the first inner toothing end 32, the reverse case results. In this case, the diameter DI decreases from the second inner toothing end 34 to the first inner toothing end 32, in which the diameter DI can also remain constant in some sections. Under no circumstance does it increase when considered starting from the second inner toothing end 34 to the first inner toothing end 32.

The first section 32, in which the diameter DI of the inner toothing 30 remains constant, may also be omitted.

Figures 2A, 2B:
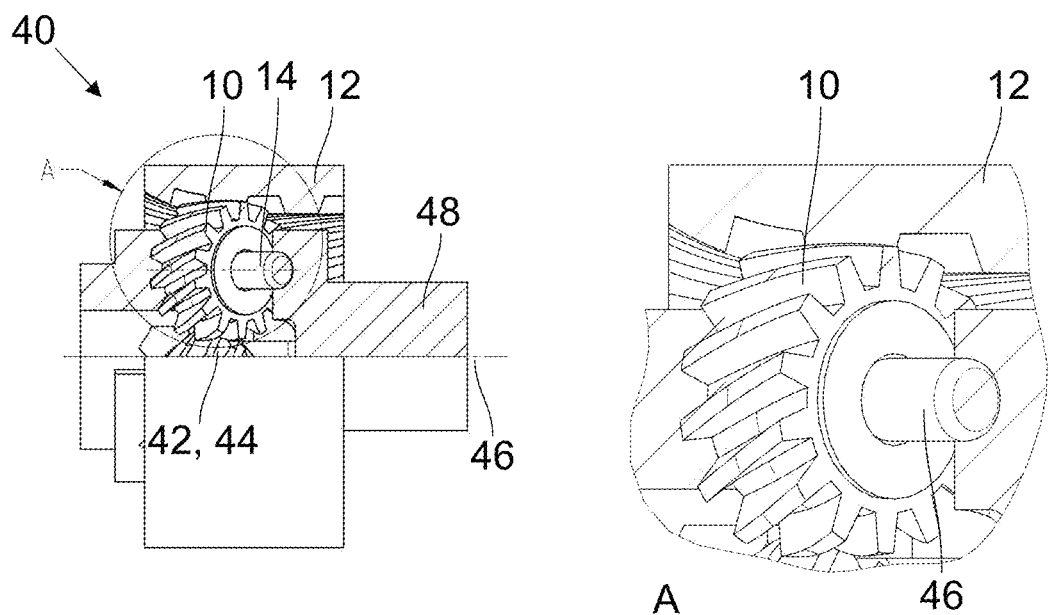
FIG. 2a) shows a helical planetary gear unit according to the proposal by means of a first partial sectional view.
FIG. 2b) shows an enlarged view of area A characterized in FIG. 2a)

FIGS. 2a) to 2e) show various views of a helical planetary gear unit 40 according to the disclosure, which has a total of three helical planetary gears 10, which have been described schematically in FIG. 1. In addition, the helical planetary gear unit 40 has an internal helical gear 12, which has the principal structure that has been described in FIG. 1.

FIG. 2c) shows that the helical planetary gear unit 40 has a helical gear shaft 42 with helical gear toothing 44. The helical gear shaft 42 is mounted so as to rotate about a helical gear shaft axis 46, which is not shown in greater detail.

FIGS. 2a) to 3e) particularly show that the helical planetary gears 10 are mounted so as to rotate about their planetary gear axes 14 in a planetary carrier 48, in which the planetary gear axes 14 extend skewed with respect to the helical gear shaft axis 46.

Due to the fact that the planetary gear axes 14 extend skewed with respect to the planetary gear shaft axis 46, it is almost impossible to show a sectional view in which the curvatures or the crowning of both the helical planetary gears 10 and the internal helical gear 12 can be seen. FIGS. 3a) to 3e) show the helical planetary gear unit 40 by means of the same views as in FIGS. 2a) to 2e), in which, however, the toothing of the helical gear shaft 42, of the helical planetary gears 10, and of the internal helical gear 12 have been omitted for clarity of presentation. In FIG. 1, the helical planetary gear 10 is rotated relative to the internal helical gear 12 such that the internal helical gear axis 28 and the planetary gear axis 14 extend parallel to one another, for clarity of presentation.

As can best be seen from FIGS. 1 and 3b), the helical planetary gears 10 are aligned in relation to the internal helical gear 12 when the helical planetary gear unit 40 is installed, such that the first section 22 and the second section 38, in which the diameter DP of the planetary gear toothing 16 and the diameter DI of the inner toothing 30, respectively, increase, show opposite directions in relation to the helical gear shaft axis 46. In other words, the diameter DP of the planetary gear toothing 16 and the diameter DI of the inner toothing 30 change, in the installed state, depending on the direction of movement along the helical gear shaft axis, such that they either only increase or only decrease.

This ensures that the engagement of the helical planetary gears 10 into the internal helical gear 12 and into the helical gear shaft 42 takes place extensively uniformly from the first planetary gear toothing end 18 to the second planetary gear toothing end 20. Since the first section 22 of the helical planetary gear 10 and the second section 38 of the internal helical gear 12, in which the diameter DP of the planetary gear toothing 16 or the diameter DI of the inner toothing 30 increase, have a centering effect when the helical planetary gears 10 are engaged with the internal helical gear 12, installation of the helical planetary gear unit 40 is facilitated.

Particularly with respect to FIGS. 2e) and 3e), it should be noted that the second section 38 may also be arranged at the other end of the internal helical gear 12. In this case, the first sections 22 and the second sections 24 of the helical planetary gears are arranged in the reverse and the installation takes place from the opposite direction.

REFERENCE LIST

10 Helical planetary gear
12 Internal helical gear
14 Planetary gear axis
16 Planetary gear toothing
18 First planetary gear toothing end
20 Second planetary gear toothing end
22 First section
24 Second section
28 Internal helical gear axis
30 Inner toothing
32 First inner toothing end
34 Second toothing end
36 First section
38 Second section
40 Helical planetary gear unit
42 Helical gear shaft
44 Helical gear toothing
46 Helical gear shaft axis
48 Planetary carrier
DP Planetary gear diameter
DI Internal helical gear diameter

What is claimed:

1. A helical planetary gear for a helical planetary gear unit for an adjusting device for adjusting two components which are adjustable with respect to one another, comprising:
   a planetary gear axis defined by the planetary gear;
   a planetary gear toothing having a first planetary gear toothing end and a second planetary gear toothing end, wherein the first planetary gear toothing end and the second planetary gear toothing end are arranged apart from one another in relation to the planetary gear axis; and
   wherein the planetary gear toothing has a diameter that increases or decreases proceeding from the first planetary gear toothing end to the second planetary gear toothing end.

2. The helical planetary gear according to claim 1, wherein the helical planetary gear comprises plastic and is casted.

3. The helical planetary gear according to claim 1, wherein the helical planetary gear comprises plastic and is injection-molded.

4. The helical planetary gear according to claim 1, wherein the helical planetary gear comprises metal.

5. An internal helical gear for a helical planetary gear unit for an adjusting device for adjusting two components which are adjustable with respect to one another, comprising:
- an internal helical gear axis defined by the helical gear;
- an inner toothing having a first inner toothing end and a second inner toothing end, wherein the first inner toothing end and the second inner toothing end are arranged apart from one another in relation to the internal helical gear axis; and
- wherein the inner toothing has a diameter that increases or decreases proceeding from the first inner toothing end to the second inner toothing end.

6. The internal helical gear according to claim 5, wherein the internal helical gear comprises plastic and is casted.

7. The internal helical gear according to claim 5, wherein the internal helical gear comprises plastic and is injection-molded.

8. The internal helical gear according to claim 5, wherein the internal helical gear comprises metal.

9. A helical planetary gear unit for an adjusting device for adjusting two components which are adjustable with respect to one another, comprising:
- a helical gear shaft with a helical gear shaft axis, the helical gear shaft comprising helical gear toothing, wherein the helical gear shaft is mounted so as to rotate about the helical gear shaft axis;
- a planetary carrier with at least one helical planetary gear, the planetary gear comprising:
  - a planetary gear axis defined by the planetary gear;
  - a planetary gear toothing having a first planetary gear toothing end and a second planetary gear toothing end, wherein the first planetary gear toothing end and the second planetary gear toothing end are arranged apart from one another in relation to the planetary gear axis; and
  - wherein the planetary gear toothing has a diameter that increases or decreases proceeding from the first planetary gear toothing end to the second planetary gear toothing end;
- wherein the helical planetary gear is mounted so as to rotate about the planetary gear axis in the planetary carrier;
- wherein the planetary gear axis extends skewed with respect to the helical gear shaft axis and the planetary gear toothing is meshed with the helical gear toothing; and
- an internal helical gear comprising:
  - an internal helical gear axis defined by the helical gear;
  - an inner toothing having a first inner toothing end and a second inner toothing end, wherein the first inner toothing end and the second inner toothing end are arranged apart from one another in relation to the internal helical gear axis; and
  - wherein the inner toothing has a diameter that increases or decreases proceeding from the first inner toothing end to the second inner toothing end; and
- wherein the inner toothing is meshed with the planetary gear toothing.

* * * * *